United States Patent [19]

Glehr

[11] Patent Number: 5,926,107
[45] Date of Patent: Jul. 20, 1999

[54] METHOD FOR OPERATING AN ANTI-THEFT SYSTEM AND ANTI-THEFT SYSTEM OPERATING ACCORDING TO THE METHOD

[75] Inventor: Manfred Glehr, Neutraubling, Germany

[73] Assignee: Siemens Aktiengesellschaft, Munich, Germany

[21] Appl. No.: 08/801,637

[22] Filed: Feb. 18, 1997

[30] Foreign Application Priority Data

Feb. 16, 1996 [DE] Germany .................. 196 05 836

[51] Int. Cl.$^6$ ................ G07D 7/00; B60L 1/00; B60R 25/00; B60R 25/04
[52] U.S. Cl. .................. 340/825.34; 307/10.1; 307/10.2; 307/10.3; 340/825.54
[58] Field of Search ............ 340/825.34, 825.54, 340/825.72, 825.69; 307/10.1, 10.2, 10.3, 10.6

[56] References Cited

U.S. PATENT DOCUMENTS

| 5,053,774 | 10/1991 | Schuermann et al. |
| 5,428,638 | 6/1995 | Cioffi et al. ............... 375/224 |
| 5,616,966 | 4/1997 | Fischer et al. ............ 307/10.5 |

*Primary Examiner*—Brian Zimmerman
*Assistant Examiner*—Anthony A. Asongwed
*Attorney, Agent, or Firm*—Herbert L. Lerner; Laurence A. Greenberg

[57] ABSTRACT

In a method for operating an anti-theft system and an anti-theft system operating according to the method, a stationary transceiver sends a question code signal to a portable transponder, which in turn responds with an answer code signal. The answer code signal is scanned at predetermined scanning times and a piece of code information is demodulated therefrom. If the first bits of the answer code signal are already unreadable, then the scanning time is displaced by a phase angle, and the remainder of the answer code signal is read.

9 Claims, 3 Drawing Sheets

METHOD FOR OPERATING AN ANTI-THEFT SYSTEM AND ANTI-THEFT SYSTEM OPERATING ACCORDING TO THE METHOD

BACKGROUND OF THE INVENTION

FIELD OF THE INVENTION

The invention relates to a method for operating an anti-theft system for a motor vehicle, and to an anti-theft system operating according to the method, especially a locking system for doors of a motor vehicle and an immobilizer by which starting of the engine is enabled upon authorization.

An anti-theft system which is known from U.S. Pat. No. 5,053,774 has a transceiver disposed in a motor vehicle, that transmits a question code signal. A portable transponder receives the question code signal when it is located in the vicinity of the transceiver. A piece of code information is thereupon transmitted back to the transceiver and evaluated in she transceiver.

However, in such an anti-theft system, it can happen that no code signal is detected by the transceiver despite a properly functioning transponder. That happens if an operating point of the system is shifted far enough that it is in a so-called zero position, because of component tolerances or the effects of temperature.

SUMMARY OF THE INVENTION

It is accordingly an object of the invention to provide a method for operating an anti-theft system and an anti-theft system operating according to the method, which overcome the hereinafore-mentioned disadvantages of the heretofore-known methods and devices of this general type and which permit locking or unlocking of doors or starting of the motor vehicle that is reliable and is as fast as possible, despite component tolerances and the effects of temperature.

With the foregoing and other objects in view there is provided, in accordance with the invention, a method for operating an anti-theft system for a motor vehicle, which comprises transmitting a question code signal from a transceiver disposed in a motor vehicle, as a consequence of actuation of a switch; sending a piece of code information carried in a portable transponder back to the transceiver in an answer code signal, after receiving the question code signal; scanning the answer code signal with a demodulator in the transceiver at predetermined scanning times and obtaining the code information therefrom; comparing the detected code information with desired code information in a comparison unit; generating a release signal in a control unit if the two pieces of information correspond.

According to one embodiment of the invention, the method further comprises scanning a first portion of the answer code signal at predetermined scanning times within a first period of time being substantially shorter than a duration of transmission of the complete answer code signal; scanning the answer code signal completely if the amplitudes of the answer code signal scanned in the first period of time are above a predetermined threshold value; and if not once again scanning the answer code signal, displaced by a predetermined phase angle, at a different scanning time.

According to another embodiment of the invention, the method additionally comprises scanning a first portion of the answer code signal at least at two different, predetermined scanning times within a first period of time being substantially shorter than a duration of transmission of the complete answer code signal; detecting the amplitudes at the two scanning times and comparing the amplitudes with one another; and scanning the remaining answer code signal at whichever scanning time a higher amplitude was detected.

In accordance with another mode of the invention, there is provided a method which comprises once again scanning the answer code signal displaced by a phase angle of approximately 90° relative to the predetermined scanning times.

In accordance with a further mode of the invention, there is provided a method which comprises dimensioning the first period of time for detecting at least the first two bits of the answer code signal.

In accordance with an added mode of the invention, there is provided a method which comprises storing the phase angle as a correction value in a memory of the transceiver and using the phase angle in all later scanning operations to determine the scanning times.

In accordance with an additional mode of the invention, there is provided a method which comprises supplying the answer code signal to the demodulator in damped condition during the first period of time.

In accordance with yet another mode of the invention, there is provided a method which comprises locking or unlocking a door lock or releasing an immobilizer with the release signal.

With the objects of the invention in view there is also provided an anti-theft system for a motor vehicle, comprising a transceiver disposed in a motor vehicle for transmitting a question code signal as a consequence of actuation of a switch; a portable transponder carrying and sending a piece of code information back to the transceiver in an answer code signal, after receiving the question code signal; a demodulator in the transceiver for scanning the answer code signal at predetermined scanning times and obtaining the code information therefrom; a comparison unit connected to the demodulator for comparing the detected code information with desired code information; and a control unit connected to the comparison unit for generating a release signal if the two pieces of information correspond.

According to one embodiment of the invention, a first portion of the answer code signal is scanned at the predetermined scanning times within a first period of time being substantially shorter than a duration of transmission of the complete answer code signal; the answer code signal is completely scanned if the amplitudes of the answer code signal scanned in the first period of time are above a predetermined threshold value; and if not the answer code signal is scanned once again, displaced by a predetermined phase angle, at a different scanning time.

According to another embodiment of the invention, a first portion of the answer code signal is scanned at least at two different, predetermined scanning times within a first period of time being substantially shorter than a duration of transmission of the complete answer code signal; the amplitudes are detected and the two scanning times are compared with one another; and the remaining answer code is scanned at whichever scanning time a higher amplitude was detected.

The anti-theft system has a transceiver in the motor vehicle, which transmits a question code signal in response to the actuation of a switch. The question code signal is received by a portable transponder, which thereupon transmits an answer code signal to the transceiver, in the form of a transponder- or user-specific piece of code information stored in memory or generated therein.

A modulator in the transceiver scans the answer code signal at predetermined, equidistant scanning times and thus detects the code information. A comparison unit compares the code information with a piece of desired code information, and if the two pieces of code information correspond, it generates a release signal.

According to the invention, initially only a first, small portion of the answer code signal is scanned. If the scanned values largely correspond to desired values, then the answer code signal is scanned completely. If not, the scanning times are displaced by a predetermined phase angle, and the answer code signal is scanned completely.

Thus the entire answer code signal need not be initially read out in order to ascertain whether or not an operating point of the anti-theft system has shifted. It suffices for only a few bits of the answer code signal to be read.

Other features which are considered as characteristic for the invention are set forth in the appended claims.

Although the invention is illustrated and described herein as embodied in a method for operating an anti-theft system and an anti-theft system operating according to the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
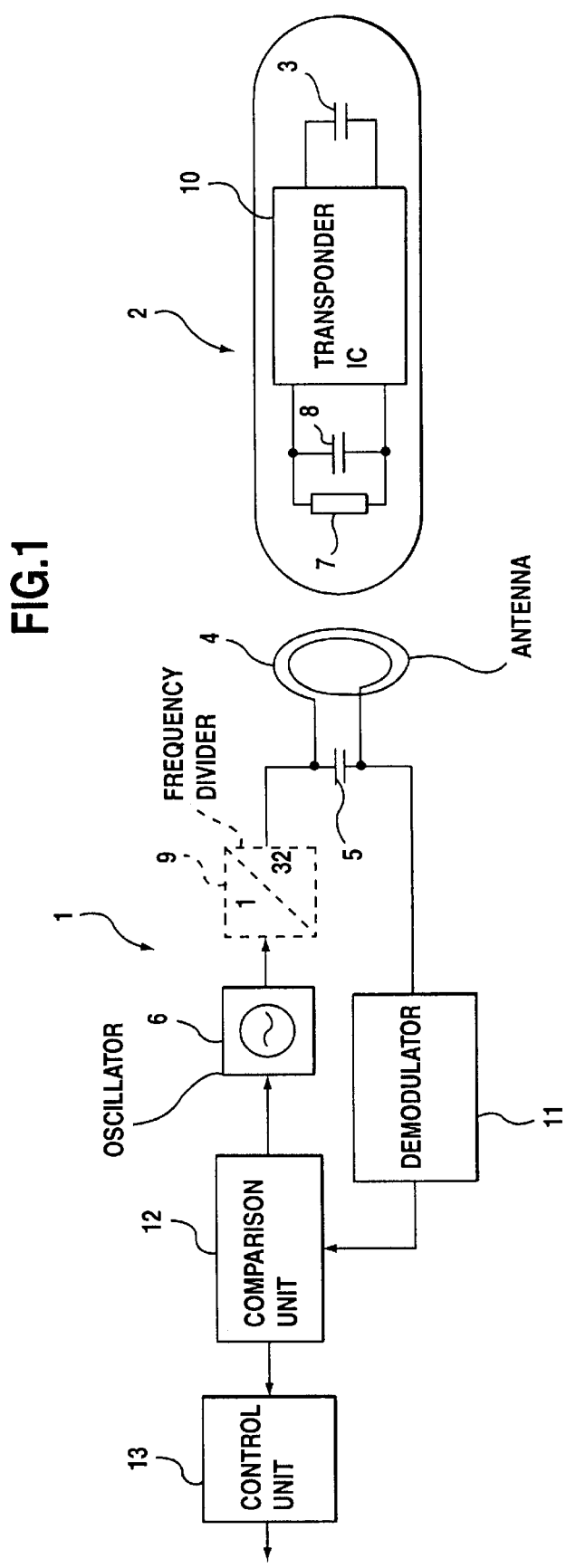
FIG. 1 is a schematic and block circuit diagram of the anti-theft system of the invention.

Referring now to the figures of the drawings in detail and first, particularly, to FIG. 1 thereof, there is seen an anti-theft system according to the invention which has a transceiver 1 that is disposed in a motor vehicle and cooperates with a portable transponder 2 through a transformer-type coupling, if the transponder 2 is located in the vicinity of the transceiver 1. The transceiver 1 generates a magnetic alternating field, through the use of which coded binary data or energy is transmitted, with a sinusoidal, high-frequency carrier signal (modulated oscillation), to the transponder 2 (the signal transmitted to the transponder 2 will be referred to below as a question code signal). The question code signal causes the transponder 2 to transmit data, in the form of a modulated oscillation, back to the transceiver 1 (the signal transmitted back to the transceiver 1 will be referred to below as an answer code signal.

The transponder 2 may be supplied with energy from its own voltage source. Alternatively the transponder 2 may draw energy from the question code signal and temporarily store it in a charging capacitor 3 in the transponder 2.

In order to provide transmission of data/energy and transmission back again of data, the transceiver 1 has an oscillating circuit (referred to below as an antenna oscillating circuit), which contains at least one antenna 4 in the form of a coil, and one capacitor 5. The antenna oscillating circuit is incited to oscillate with the aid of an oscillator 6. A piece of coded information can be transmitted in the question code signal to the transponder 2 with the aid of a non-illustrated modulator.

The transponder 2 also has an oscillating circuit (referred to below as a transponder oscillating circuit), with a coil 7 and a capacitor 8. If the antenna 4 and the coil 7 are in the immediate vicinity of one another, an inductive coupling, and therefore a transmission of data and/or energy in both directions, thus occurs.

As soon as a non-illustrated switch, in or on the motor vehicle (for instance, an ignition switch in the ignition lock) is actuated, the oscillator 6 imposes a sinusoidal high-frequency oscillation upon the antenna oscillating circuit. The frequency of the oscillation depends on the oscillator frequency or also on a divider ratio of a frequency divider 9 that may optionally be present. The result is accordingly a sinusoidal oscillation, which generates a magnetic alternating field.

If the coil 7 of the transponder 2 is located in the vicinity of the antenna 4 then, because of the inductive or transformer-type coupling, a sinusoidal alternating voltage is induced in the coil 7 of the transponder 2. In other words, an oscillation is compelled. As a result, a transponder IC 10 is activated, causing the oscillation to be amplitude-modulated or pulse-width-modulated as a result of a piece of binary code information either stored in memory or generated in the transponder IC 10. The code information contains a "password" of the transponder 2 for the use of the motor vehicle.

Since the transponder 2 and the transceiver 1 are inductively coupled with one another, this modulated oscillation has a feedback effect, as the answer code signal, acting on the antenna oscillating circuit and imposes the modulated oscillation thereon.

The modulated oscillation of the antenna oscillating circuit is detected by a demodulator 11. To that end, the oscillation is scanned at determined scanning times, and the scanned instantaneous values are evaluated as to their amplitudes. Since the code information is contained in the amplitudes of the modulated oscillation, the code information in the transceiver 1 is retrieved in this way.

The detected code information is compared in a comparison unit 12 with a piece of expected desired code information stored in memory there. If the two pieces of code information correspond, then the answer code signal was correct. A release signal is thereupon generated in the comparison unit 12 or a separate control unit 13, and through the use of this signal the locks of doors are locked or unlocked, or an immobilizer is released.

Through the use of the code information of the transponder 2, the oscillation is modulated in its amplitude or in its pulse width. This does not change the frequency of the oscillation. The result is accordingly a modulated oscillation with a plurality of segments A, B, etc., each of which represent logical states of the code information. The code information, which is detected by the demodulator 11, is contained in an envelope curve (represented in FIG. 2 by a dashed line) of the modulated oscillation.

Each segment A, B, etc. corresponds to at least one bit of the code signal. Each segment contains a plurality of periods of the oscillation, each having the same period duration T and the same amplitude. Depending on the code information, the amplitude in the next segment or the next bit can vary, if the envelope curve changes over from one logic state, such as "0" or "low", to another logic state, such as "1" or "high", or vice versa.

If the amplitude changes, then normally the phase of the oscillation also varies, as a result of the modulation. In the following description which relates to FIG. 3, an oscillation A during a period length in the segment A of a maximum amplitude A (corresponding to "0", for instance) and an oscillation B during a period duration in the segment B of a maximum amplitude B (corresponding to "1", for instance) will therefore be observed below to represent the entire oscillation. The maximum amplitudes A and B differ by the difference $\Delta U = B - A$.

The demodulator 11 scans the modulated oscillation at a predetermined scanning time $t_0$ (in this case, for instance, at a phase angle of 90° in relation to a phase angle of 0° at the beginning of each oscillation period of oscillation A). The instantaneous value at the scanning time $t_0$, that is the amplitude at the scanning time $t_0$, is detected and evaluated.

Figure 2:
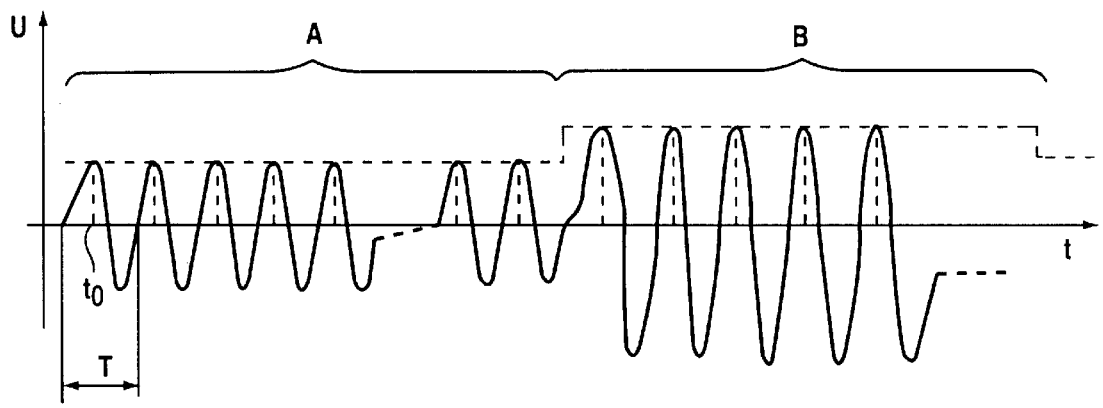
FIG. 2 is a graph showing a modulated oscillation in a transceiver of the anti-theft system.
Figure 3:
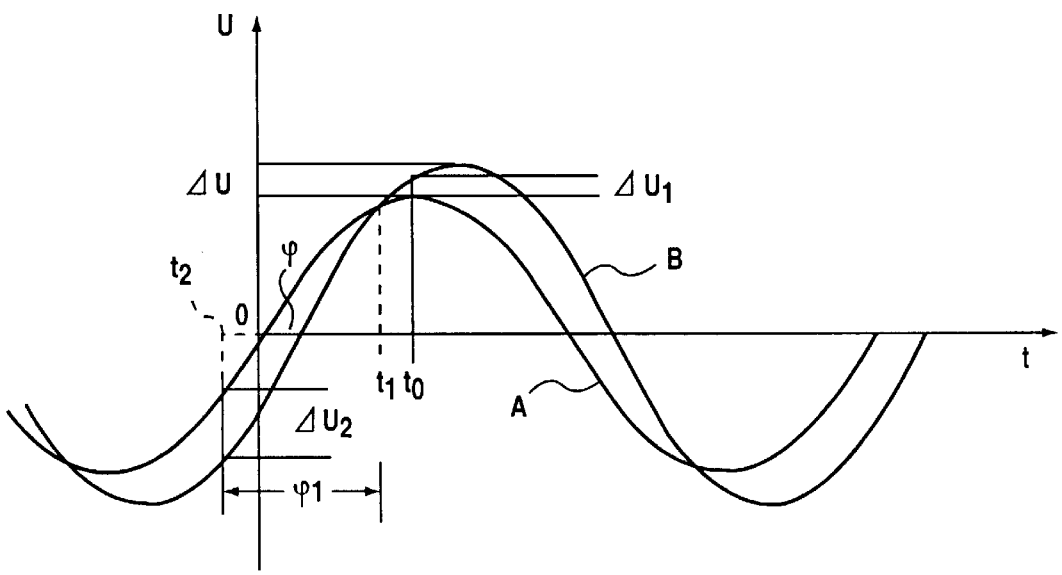
FIG. 3 is a graph showing two periods of the modulated oscillation of FIG. 3.

FIG. 3 shows one period each of the modulated oscillation of the segment A and B. The two oscillations A and B in actuality do not appear simultaneously but are rather located in chronologically successive segments, as is shown in FIG. 2. If the amplitude varies between the two segments A and B, then as a rule a phase discontinuity also takes place as a result of the modulation. The two oscillation courses A and B are therefore shown phase-displaced one above the other in FIG. 3, with the oscillation B being phase-displaced by a phase angle φ relative to the oscillation A.

In order to obtain the code information, the oscillation is scanned at equidistant scanning times. The modulated oscillation can be scanned multiple times within one period duration T, or once within a plurality of periods. However, within each period duration, the scanning time is initially fixed in its phase.

If the modulated oscillation is always scanned at a constant time within the period, in this case, for instance, at the scanning time $t_0 = 90°$ (referred to the oscillation A), then one obtains the maximum amplitude from the oscillation A. Since the oscillation B is phase-displaced by the phase angle φ, in the exemplary embodiment of FIG. 3 at this time $t_0$ one does not obtain the maximum amplitude but nevertheless obtains a readily usable amplitude, which is markedly different from that of the oscillation A by a difference $\Delta U_1$. If the difference $\Delta U_1$ between the two amplitudes is above a predetermined threshold value, then the code information can be read unambiguously. In that case, the anti-theft system is not at a zero position.

The threshold value is determined in advance and depends, among other factors, on the sensitivity of the demodulator 11, or in other words on what amplitude differences the demodulator is still capable of unequivocally distinguishing.

However, due to component tolerances and temperature factors, it can happen that on one hand the scanning time $t_0$ is more or less delayed relative to the phase angle 0°, or on the other hand that the two oscillations A and B are more or less displaced relative to one another by the phase angle φ. For instance, if the scanning time at the scanning time $t_1$ is shifted, then at this time $t_1$ both amplitudes are of equal magnitude, even though the modulated oscillations contains a piece of code information. The code information is then unreadable, and the anti-theft system is at a zero position.

Figure 4:
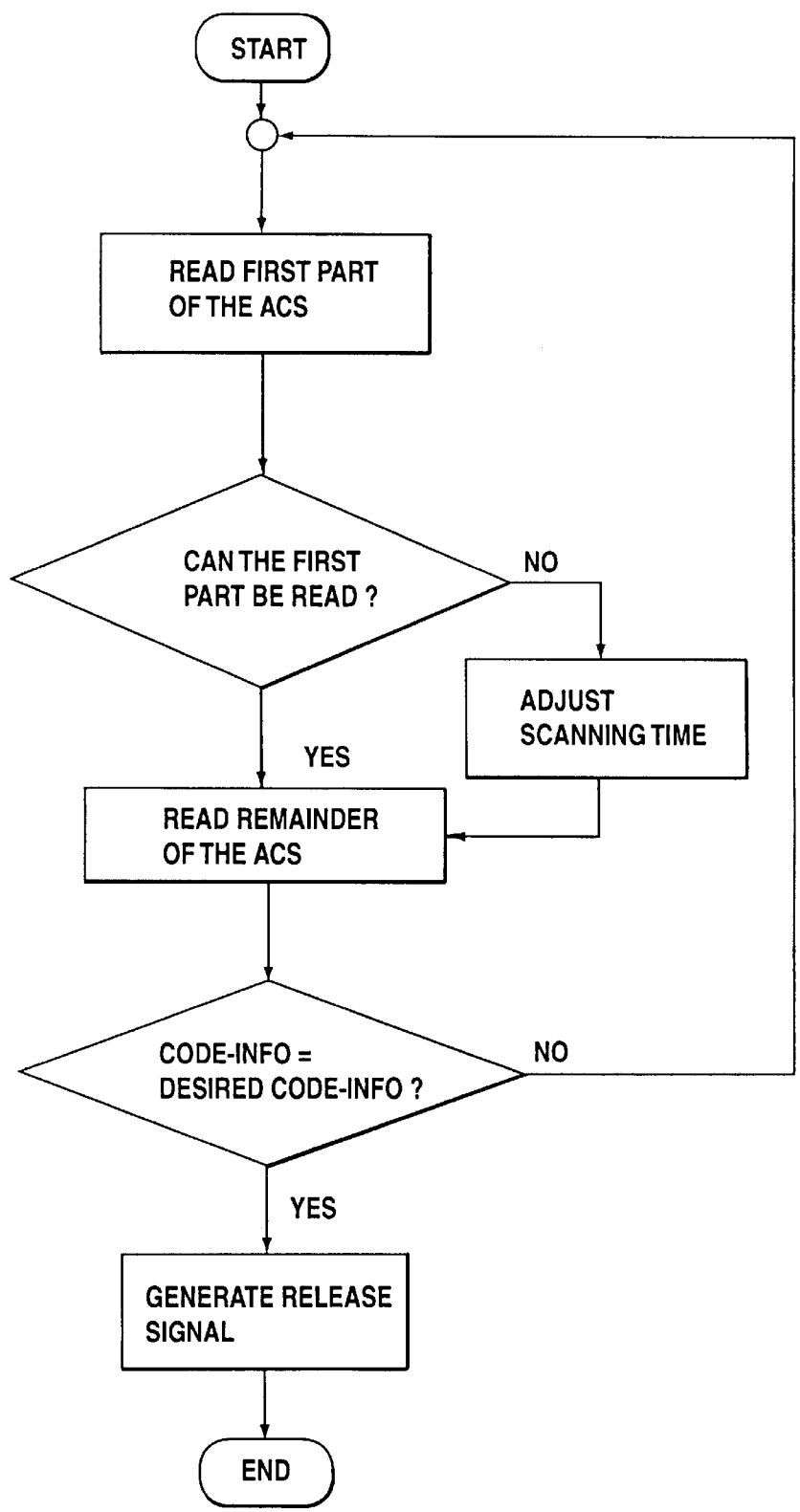
FIG. 4 is a flowchart of a method according to the invention.

The object of the present invention is then to perform an early detection as to whether or not the anti-theft system is at a zero position. In other words, it must be ascertained early whether or not evaluatable code information is present. According to the invention, as shown in FIG. 4, the first bits, that is the first segments A, B, etc., are scanned and evaluated within a first predetermined period of time. If unequivocally distinguishable amplitudes are detected in the segments, then the complete code information is read from the answer code signal (ACS) and evaluated.

However, if the difference $\Delta U_1$ between the two scanned amplitudes is less than the predetermined threshold value (for instance, if scanning was first carried out at the scanning time $t_1$), then according to the invention the original scanning time $t_1$ is changed (either made earlier or later). As can be seen from FIG. 3, even a slight displacement, for instance to the time $t_0$, then suffices.

The greatest difference in amplitudes, specifically a difference $\Delta U_2$, is obtained if the scanning time is displaced by the phase angle $φ_1 = ±90°$, if at first no evaluatable amplitude difference was scanned. Consequently, for the remainder of the answer code signal, the scanning time $t_2$ is chosen instead of the scanning time $t_1$ (in FIG. 3, for the sake of simplicity, the scanning time is shown displaced by $φ_1 = -90°$ and as a result, only the sign of the amplitude changes as compared with a displacement by $φ_1 = +90°$). Scanning of the modulated oscillation is accordingly continued, after the shifting of the scanning time, and then the code information can be reliably read.

It is advantageous if the first bits of the answer code signal are check bits, so that it can be ascertained whether or not an evaluatable amplitude difference between the two oscillations is present. If the amplitudes hardly differ, then the scanning time can immediately be changed, so that the code information can then be read out of the answer code signal at a different scanning time.

If the two bits of the answer code signal are not check bits, then after the adjustment of the scanning time the answer code signal must be read again. However, it may also be permitted for the first bits of the code information not to be taken into account upon comparison with the desired code information, because after all they are not unequivocally readable.

The number of check bits depends on the length of time needed for reliable detection of the zero position. For instance, if a check bit of 50 μs is present and the reliable detection of a zero point is concluded within a maximum of 150 μs (which is equal to the first period of time), then consequently at least three check bits should precede the code information. The code information itself may, for instance, be 128 bits long.

However, the reading of the answer code signal may also be discontinued and an answer code signal can be demanded again by the transmission of a new question code signal. The new answer code signal is then scanned at the changed scanning time.

The phase angle $φ_1$ (together with the scanning time $t_0/t_1$) by which the scanning time is shifted, or the scanning time $t_2$ may be stored in memory as a correction value in the demodulator 11. In later question and answer dialogs, that is the transmission of the question code signal and the return of the answer code signal, between the transceiver 1 and the transponder 2 and the attendant operations of scanning of the answer code signal, this correction value can then already be taken into account the first time that the answer code signal is scanned.

Purely theoretically, it is possible to detect even the first transition from logical "0" to "1", or from "1" to "0", of the answer code signal and to determine whether an adequate amplitude difference is present. However, the method becomes more reliable if a plurality of bits with a plurality of transitions at the beginning of the answer code signal are read and evaluated.

The amplitudes which are measured at the scanning times can be compared with desired amplitudes that are stored in memory in the transceiver 1. A bit pattern, including a plurality of bits, at the beginning of the answer code signal can also be detected and compared with a bit pattern stored in memory. In order to decide whether or not a zero position is present, it is naturally sufficient to detect merely the first portion of the arriving answer code signal.

A brief resting period of 5 ms, for instance, can be observed between switchovers of the scanning times, so that the transceiver 1 will change over to its resting state. The question code signal can then be transmitted again and the answer code signal can be requested and also scanned with a changed scanning time.

Checking whether a zero position is present or not is advantageously not performed until the transient phase of the antenna oscillating circuit is ended upon response of the answer code signal, or in other words the modulated oscillation of the antenna oscillating circuit has changed over to its stable, steady state.

The threshold value with which the detected amplitude of the oscillation is compared represents a sharply defined limit. Due to inherent system fluctuations, for instance in the sensitivity of the demodulator 11, it is therefore more advantageous if this limit is softened by a tolerance band of predetermined bandwidth thus providing a certain margin of safety. To that end, upon checking whether or not the answer code signal can be read, the modulated oscillation can also be supplied to the demodulator 11 damped in its amplitude by a reduction factor.

The damping of the amplitudes causes a reduction in the amplitude difference. If even lesser amplitudes can be reliably detected, then this is certainly true for larger amplitudes.

The answer code signal is therefore supplied to the demodulator 11 undamped when the remainder of the answer code signal is read. This assures that the distance from the threshold value is increased, and the entire answer code signal can be reliably read if the first bits can already be read out with damped, reduced amplitude, even if inherent system amplitude fluctuations are present over the duration of the entire answer code signal.

The oscillator 6, the demodulator 11 and the comparison unit 12 can be integrated in a customer-specific IC. This reduces the effect of component tolerances.

According to another exemplary embodiment of the invention, the first portion of the answer code signal can be scanned at least at two different, predetermined scanning times within the first period of time, which period is substantially shorter than the duration of transmission of the complete answer code signal. The scanning times are appropriately apart from one another by a phase angle of about 90°, as is true, for instance, for the times $t_0/t_1$ and $t_2$ in FIG. 3. The amplitudes are detected at both scanning times $t_0$ or $t_1$ and $t_2$ and compared with one another. The remaining answer code signal is then scanned at whichever scanning time, $t_0/t_1$ or $t_2$ the larger amplitude difference $\Delta U_1$ or $\Delta U_2$ was found. The answer code signal can thus be reliably read even under less-favorable conditions. The corresponding scanning time, $t_0/t_1$ or $t_2$ can then be stored in memory as a correct value and used in future question and answer dialogs.

In this exemplary embodiment, the scanning times $t_0/t_1$ and $t_2$ may be located within one period duration of the oscillation, or else the scanning time $t_0/t_1$ may be located within a first period duration and the scanning time $t_2$ within a second, successive period duration, but the scanning times $t_0/t_1$ and $t_2$ must each still be located within the same segment A, B, etc., and must differ from one another by approximately 90° or 270° with reference to one oscillation.

According to FIG. 3, in this exemplary embodiment, the scanning time $t_2$ for reading the remainder of the answer code signal would be used and optionally stored in memory as a correction value, because in that case the amplitude difference $\Delta U_2$ is greater than $\Delta U_1$.

The anti-theft system according to the invention is used for a locking system or an immobilizer. The transponder 2 is located on a door or ignition key, and the antenna 4 is in the door or ignition lock. When the key is inserted into the lock and turned, the question and answer dialog between the transceiver 1 and the transponder 2 is tripped in response to the actuation of the lock switch or ignition switch.

If the code information generated or stored on the transponder 2 corresponds to the desired code information, then the release signal is generated, thus enabling use of the motor vehicle.

The invention assures that the question and answer dialog can be carried out as fast and reliably as possible.

The question code signal and the answer code signal are signals that are the same (fixed code) each time they are transmitted or that change constantly (changing code). Cryptographic methods may also be employed, in which a random number in the question code signal is transmitted to the transponder 2 and there encrypted with the aid of a mathematical algorithm and then sent back as an answer code signal to the transceiver 1.

The term "code signal" is understood to mean signals that include many bits, in a binary pattern fixed by a code. In the case of an answer code signal, the code information defines the binary pattern.

The term "scanning time" is understood to mean a time, known angular degree, within each period length of one oscillation, at which the amplitude is measured. The indication in angular degrees refers to the beginning of the first oscillation period having the period duration T in the segment A, or in other words 0° of the oscillation A.

I claim:

1. A method for operating an anti-theft system for a motor vehicle, which comprises:

transmitting a challenge code signal from a transceiver disposed in a motor vehicle, as a consequence of actuation of a switch; sending code information carried in a portable transponder back to the transceiver in a response code signal, after receiving the challenge code signal;

scanning a first portion of the response code signal at predetermined scanning times within a first period of time being substantially shorter than a duration of transmission of the complete response code signal;

scanning the response code signal completely if the amplitudes of the response code signal scanned in the first period of time are above a predetermined threshold value and obtaining the code information therefrom;

displacing the response code signal by a predetermined phase angle, and completely scanning, the response code signal, displaced by the predetermined phase angle, at a different scanning time, if the amplitudes of the response code signal scanned in the first period of time are not above the predetermined threshold value and obtaining the code information therefrom; and comparing the detected code information with desired code information in a comparison unit and generating a release signal in a control unit if the two pieces of information correspond.

2. The method according to claim 1, which comprises once again scanning the response code signal displaced by a phase angle of approximately 90° relative to the predetermined scanning times.

3. The method according to claim 1, which comprises dimensioning the first period of time for detecting at least the first two bits of the response code signal.

4. The method according to claim 1, which comprises storing the phase angle as a correction value in a memory of the transceiver and using the phase angle in all later scanning operations to determine the scanning times.

5. The method according to claim 1, which comprises supplying the response code signal to the demodulator in damped condition during the first period of time.

6. The method according to claim 1, which comprises locking or unlocking a door lock or releasing an immobilizer with the release signal.

7. A method for operating an anti-theft system for a motor vehicle, which comprises:

transmitting a challenge code signal from a transceiver disposed in a motor vehicle, as a consequence of actuation of a switch;

sending code information carried in a portable transponder back to the transceiver in a response code signal, after receiving the challenge code signal;

scanning a first portion of the response code signal at least at two different, predetermined scanning times within a first period of time being substantially shorter than a duration of transmission of the complete response code signal;

detecting the amplitudes at the two scanning times and comparing the amplitudes with one another;

scanning the remaining response code signal at whichever scanning time a higher amplitude was detected and obtaining the code information therefrom; and comparing the detected code information with desired code information in a comparison unit and generating a release signal in a control unit if the two pieces of information correspond.

8. An anti-theft system for a motor vehicle, comprising:

a transceiver disposed in a motor vehicle for transmitting a challenge code signal as a consequence of actuation of a switch;

a portable transponder carrying and sending a piece of code information back to said transceiver in a response code signal, after receiving the challenge code signal;

a demodulator in said transceiver for scanning the response code signal at predetermined scanning times and obtaining the code information therefrom;

a comparison unit connected to said demodulator for comparing the detected code information with desired code information; and a control unit connected to said comparison unit for generating a release signal if the two pieces of information correspond;

said demodulator scanning a first portion of the response code signal at the predetermined scanning times within a first period of time being substantially shorter than a duration of transmission of the complete response code signal;

said demodulator completely scanning the response code signal if the amplitudes of the response code signal scanned in the first period of time are above a predetermined threshold value; and said demodulator once again scanning the response code signal, displaced by a predetermined phase angle, at a different scanning time, if the amplitudes of the response code signal scanned in the first period of time are not above the predetermined threshold value.

9. An anti-theft system for a motor vehicle, comprising:

a transceiver disposed in a motor vehicle for transmitting a challenge code signal as a consequence of actuation of a switch;

a portable transponder carrying and sending a piece of code information back to said transceiver in a response code signal, after receiving the challenge code signal;

a demodulator in said transceiver for scanning the response code signal at predetermined scanning times and obtaining the code information therefrom;

a comparison unit connected to said demodulator for comparing the detected code information with desired code information;

a control unit connected to said comparison unit for generating a release signal if the two pieces of information correspond;

said demodulator scanning a first portion of the response code signal at least at two different, predetermined scanning times within a first period of time being substantially shorter than a duration of transmission of the complete response code signal;

said demodulator detecting the amplitudes at the two scanning times;

said comparison unit comparing the two scanning times with one another; and said demodulator scanning the remaining response code signal at whichever scanning time a higher amplitude was detected.

* * * * *